US012793427B1

(12) United States Patent
Ganesh et al.

(10) Patent No.: US 12,793,427 B1
(45) Date of Patent: Nov. 10, 2026

(54) CASINO SURVEILLANCE SYSTEM WITH AI-DRIVEN FACIAL RECOGNITION AND ASSET DAMAGE DETECTION

(71) Applicant: LNW Gaming, Inc., Las Vegas, NV (US)

(72) Inventors: Marimuthu Ganesh, Chennai (IN); Arun Brown Ganesan, Chennai (IN); Sivasankari Kamalanathan, Chennai (IN); Vignesh Raju Pandiaraj, Chennai (IN); Vigneshraj Veerapathiraraj, Chennai (IN); Santhosh Balaji, Chennai (IN); Sushmitha Babu, Chennai (IN); Ragavendran Babu, Chennai (IN); Thanigaivelan Jagadeeswaran, Ranipet district (IN)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

(21) Appl. No.: 19/277,486

(22) Filed: Jul. 23, 2025

(51) Int. Cl.

| | |
|---|---|
| ***G06V 20/52*** | (2022.01) |
| ***G06V 10/62*** | (2022.01) |
| ***G06V 10/764*** | (2022.01) |
| ***G06V 10/77*** | (2022.01) |
| ***G06V 20/40*** | (2022.01) |

(Continued)

(52) U.S. Cl.
CPC .............. *G06V 20/52* (2022.01); *G06V 10/62* (2022.01); *G06V 10/764* (2022.01); *G06V 10/7715* (2022.01); *G06V 20/44* (2022.01); *G06V 40/168* (2022.01); *G06V 40/172* (2022.01); *G06V 40/23* (2022.01); *G08B 13/19671* (2013.01);

(Continued)

(58) Field of Classification Search
None
See application file for complete search history.

(56) References Cited

U.S. PATENT DOCUMENTS

| | | | |
|---|---|---|---|
| 6,154,131 | A | 11/2000 | Jones, II et al. |
| 6,908,385 | B2 | 6/2005 | Green |

(Continued)

FOREIGN PATENT DOCUMENTS

| | | | |
|---|---|---|---|
| WO | 0120489 | A1 | 3/2001 |
| WO | 03047258 | A1 | 6/2003 |

OTHER PUBLICATIONS

Pearson, "The Predictive Casino" (Year: 2019).*

*Primary Examiner* — Eileen M Adams

(57) ABSTRACT

A casino surveillance system and method utilize an artificial intelligence (AI) processing engine to analyze real-time video feeds from surveillance cameras. The AI processing engine includes a facial recognition module to identify individuals against a database of known persons (e.g., banned or VIP individuals). Concurrently, a damage detection module processes video feeds to detect potential damage to casino assets. This module identifies a casino asset using an object detection model, detects human body key points interacting with the asset via a pose estimation model, and classifies the interaction as potentially damaging (e.g., kicks, punches) using a suspicious action model. Upon detection of such predefined events, the system generates an alert notification and transmits it to a user interface for review by surveillance personnel. The user interface may include a dashboard and tools for incident management.

20 Claims, 8 Drawing Sheets

(51) Int. Cl.

| | |
|---|---|
| ***G06V 40/16*** | (2022.01) |
| ***G06V 40/20*** | (2022.01) |
| ***G08B 13/196*** | (2006.01) |
| ***H04N 7/18*** | (2006.01) |
| *G06V 10/82* | (2022.01) |

(52) U.S. Cl.

CPC ....... *G08B 13/19691* (2013.01); *H04N 7/181* (2013.01); *G06V 10/82* (2022.01)

(56) References Cited

U.S. PATENT DOCUMENTS

| | | | |
|---|---|---|---|
| 7,058,771 | B2 | 6/2006 | Montgomery |
| 7,525,570 | B2 | 4/2009 | Kiely et al. |
| 7,828,651 | B2 | 11/2010 | Oles et al. |
| 7,901,285 | B2 | 3/2011 | Tran et al. |
| 7,999,857 | B2 | 8/2011 | Bunn et al. |
| 8,123,618 | B2 | 2/2012 | Karmarkar |
| 8,570,375 | B1 | 10/2013 | Srinivasan et al. |
| 8,597,116 | B2 | 12/2013 | Nguyen et al. |
| 8,758,102 | B2 | 6/2014 | Block et al. |
| 8,780,199 | B2 | 7/2014 | Mimar |
| 9,986,209 | B2 | 5/2018 | Meyer |
| 10,027,711 | B2 | 7/2018 | Gill et al. |
| 10,750,133 | B2 | 8/2020 | Cui et al. |
| 10,762,744 | B2 | 9/2020 | Nguyen |
| 11,030,844 | B2 | 6/2021 | Risnoveanu |
| 11,082,668 | B2 | 8/2021 | Kanga et al. |
| 11,676,386 | B2 | 6/2023 | Saravanan et al. |
| 11,695,975 | B1 | 7/2023 | Giraud |
| 11,743,420 | B1 | 8/2023 | Klein |
| 11,836,982 | B2 | 12/2023 | Joseph et al. |
| 12,095,816 | B2 | 9/2024 | Costello et al. |
| 12,106,630 | B2 | 10/2024 | Soukup et al. |
| 12,108,193 | B1 | 10/2024 | Mcclellan |
| 12,266,236 | B2 | 4/2025 | Warren, Jr. et al. |
| 12,294,809 | B1 | 5/2025 | Cao et al. |
| 2004/0223054 | A1 | 11/2004 | Rotholtz |
| 2005/0110634 | A1 | 5/2005 | Salcedo et al. |
| 2006/0190419 | A1 | 8/2006 | Bunn et al. |
| 2007/0058040 | A1 | 3/2007 | Zhang et al. |
| 2008/0113783 | A1 | 5/2008 | Czyzewski et al. |
| 2011/0128382 | A1 | 6/2011 | Pennington et al. |
| 2013/0023316 | A1 | 1/2013 | Smith et al. |
| 2015/0312517 | A1 | 10/2015 | Hoyt et al. |
| 2017/0039807 | A1 | 2/2017 | Shigeta |
| 2020/0349820 | A1 | 11/2020 | Speagle et al. |
| 2021/0312200 | A1* | 10/2021 | Ge ...................... G06F 18/2413 |
| 2022/0327886 | A1* | 10/2022 | Mathur .................. G06N 20/00 |
| 2024/0046701 | A1 | 2/2024 | Park et al. |
| 2025/0106455 | A1 | 3/2025 | Giraud |

* cited by examiner

CASINO SURVEILLANCE SYSTEM WITH AI-DRIVEN FACIAL RECOGNITION AND ASSET DAMAGE DETECTION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2025, LNW Gaming, Inc.

FIELD OF THE INVENTION

This disclosure relates generally to security and monitoring systems and, more particularly, to an artificial intelligence-based casino surveillance system and method for real-time event detection, including facial recognition and asset damage detection, and providing corresponding alerts within a casino environment.

BACKGROUND OF THE INVENTION

The casino industry operates within a uniquely complex security landscape, driven by high-value transactions, valuable assets, a transient clientele, and significant risks from cheating, fraud, and theft. Maintaining game integrity, patron and staff safety, and adherence to stringent regulatory requirements are paramount. Failures in security can lead to substantial financial losses, reputational damage, and regulatory sanctions, making robust and advanced surveillance systems critical.

The history of casino security is one of continuous technological advancement to counter evolving threats. Early reliance on manual observation by floor staff and security guards was inherently limited by human capacity and consistency. The first major technological step was the adoption of analog Closed-Circuit Television (CCTV) systems in the 1960s and 1970s, primarily for deterring and detecting cheating and theft by recording footage onto magnetic tapes (e.g., VHS). While providing a reviewable record, these analog systems suffered from significant technical deficiencies including poor image quality, slow camera mechanics, limited storage capacity, media degradation, labor-intensive monitoring and review processes (hindering real-time computer analysis), a primarily reactive nature, and high operational costs. These limitations spurred the transition to digital technologies aimed at overcoming these specific technical hurdles.

The digital transformation began with Digital Video Recorders (DVRs) replacing tape-based systems, offering improved storage density and easier footage retrieval, which represented an improvement in data management by computer systems. Many casinos initially adopted hybrid systems, combining existing analog cameras with DVRs. This period also saw the beginnings of regulatory mandates for digital recording capabilities in some jurisdictions. The full shift occurred with the adoption of Internet Protocol (IP) cameras and Network Video Recorders (NVRs), enabling significantly higher resolution video (HD, megapixel), scalable network-based storage, and easier integration with other computer systems. This "datafication" of video, transforming visual information into a format amenable to computer processing, also facilitated early video analytics, such as motion detection, often used for storage optimization by adjusting recording quality based on detected activity—an early form of improving computer resource management.

As digital systems matured, early forms of intelligent video analytics (IVA) emerged, aiming to automate the detection of specific events beyond simple motion, thereby attempting to improve the computer's ability to interpret video data. These pre-deep learning AI analytics included rudimentary object detection (e.g., "object left behind"), people counting, and perimeter breach detection. However, these rule-based systems, while a step towards automated data interpretation, often struggled with the complexities and dynamic nature of casino environments, leading to high false positive or false negative rates, and lacked the adaptive learning capabilities of modern AI, thus limiting their practical effectiveness as reliable computer-implemented tools. Concurrently, efforts began to integrate video surveillance with other security systems like access control, and initial deployments of biometric technologies, such as fingerprint scanners or basic facial recognition for restricted area access, were seen.

The integration of modern Artificial Intelligence (AI), particularly machine learning (ML), deep learning (DL), and advanced computer vision, represents a paradigm shift in casino surveillance, offering more sophisticated ways for computer systems to process and understand video data. Core AI technologies like Convolutional Neural Networks (CNNs), Recurrent Neural Networks (RNNs), and specific architectures like ResNet are now used for complex image and video analysis by computer systems. Key AI-driven applications in modern casino security include:

- Facial Recognition: AI-powered facial recognition is widely used by computer systems to identify banned individuals, known cheaters, self-excluded patrons, and VIPs by comparing live camera images against databases. This involves a specific technical process of face detection (e.g., using models like ResNet-10 SSD), facial feature extraction (creating "embeddings" using models like ResNet-34 or FaceNet), and face matching (e.g., using Euclidean distance).
- Suspicious Action and Behavioral Analysis: AI systems analyze human actions and behaviors to detect cheating, collusion, aggression, or other security events, representing an advanced form of computer-based pattern recognition. Pose estimation techniques (e.g., using OpenPose or YOLO-Pose) identify human body key points, and the sequence of this pose data is analyzed by action recognition models (e.g., LSTMs, 3D CNNs) to classify movements.
- Object Detection for Asset Monitoring: AI-powered object detection models (e.g., YOLO series, SSD) are used by computer systems to identify, locate, and track casino assets like slot machines, gaming tables, or chip trays. This computer vision task enables monitoring asset status, detecting tampering, or, as a component in more complex analyses, detecting actions indicative of potential damage.
- Integrated AI Platforms: Modern surveillance increasingly relies on comprehensive platforms that integrate multiple AI capabilities into a unified computer system with centralized data processing, sophisticated event correlation, real-time alerting, and interactive user interfaces for incident management.

The efficacy of these AI systems depends heavily on the quality of AI models developed through iterative processes of data collection, annotation, training, and evaluation, which are themselves specific technical processes for configuring the computer models. Continuous updating and retraining are crucial for the computer models to adapt to evolving threats and dynamic casino environments.

Despite these advancements, challenges persist. These include the need for human oversight (as AI is not infallible and human judgment is often required to interpret AI outputs in context), data complexity and potential biases in AI models (which can affect the computer's decision-making process), the evolving nature of threats (requiring ongoing adaptation of the computer models), and the practicalities of system integration, scalability, and cost for these computer-intensive systems. These challenges drive ongoing innovation towards more refined, specialized, efficient, and ethically sound technical solutions for casino security.

The present disclosure addresses specific technical gaps in prior art by providing an enhanced AI-based casino surveillance system. This system offers a specific, multi-stage technical process for detecting potential damage to casino assets, which is integrated with robust facial recognition capabilities, thereby improving the computer's ability to accurately identify multiple types of security events and enhance the overall operational efficiency of surveillance personnel through a specialized technical interface. This represents a practical application of AI technology to solve concrete problems in the field of casino surveillance.

SUMMARY OF THE INVENTION

In accordance with one or more embodiments, a method for providing enhanced casino surveillance is disclosed. The method comprises receiving, by a casino surveillance system comprising a processing system and memory storing instructions, a plurality of video feeds from one or more surveillance cameras monitoring a casino environment. The method further comprises analyzing, by an artificial intelligence processing engine of the casino surveillance system, the plurality of video feeds in real-time to detect one or more predefined event types. This analysis includes processing a first portion of the video feeds by a facial recognition module to identify individuals and determine if an identified individual matches an entry in a database of known individuals. The analysis also includes processing a second portion of the video feeds by a damage detection module to identify actions indicative of potential damage to casino assets. The damage detection module is configured to identify a casino asset within the second portion of the video feeds using an object detection model; detect human body key points of an individual in proximity to or in contact with the identified casino asset using a pose estimation model; and classify an action, based on movement of the detected human body key points relative to the identified casino asset, as indicative of potential damage using a suspicious action model. The method additionally comprises generating, by the casino surveillance system, an alert notification based on the detection of a predefined event type, and transmitting, by the casino surveillance system, the alert notification to a user interface for review by surveillance personnel.

In some embodiments, the database of known individuals includes at least one of a list of banned individuals or a list of very important person (VIP) individuals. The facial recognition module may utilize a first set of artificial intelligence models comprising a face detection model to locate faces and a face recognition model to extract facial features. The face recognition model may compare extracted facial features to stored features using a predefined distance metric.

In further embodiments, the suspicious action model of the damage detection module is trained using historical video data of incidents involving damage to casino assets. The suspicious action model may be configured to classify actions including at least one of a kick, a punch, or a push directed towards the identified casino asset. The real-time analysis may also involve a behavior analysis module processing a third portion of the video feeds to detect aggressive or inappropriate behavior distinct from actions indicative of asset damage. The generated alert notification can include details such as event location, time, type, or a corresponding video segment. The method may also support receiving input from surveillance personnel via the user interface regarding actions taken and storing this information. The user interface can provide a dashboard summarizing detected events and their statuses.

In accordance with one or more other embodiments, a casino surveillance system is disclosed. The system comprises a plurality of surveillance cameras, a processing system, and memory storing instructions. When executed, these instructions configure the system to receive video feeds and analyze them in real-time via an artificial intelligence processing engine. This engine includes a facial recognition module and a damage detection module. The damage detection module identifies casino assets using an object detection model, detects human body key points interacting with the asset using a pose estimation model, and classifies these interactions as potentially damaging using a suspicious action model. The system generates and transmits alert notifications to a user interface based on detected events.

The system may be further configured with features analogous to the method embodiments, such as the database of known individuals (banned/VIP), specific models for facial recognition, training and specific classifications (kicks, punches) for the suspicious action model, an additional behavior analysis module, detailed alert notifications, and an interactive user interface with dashboard and incident logging capabilities.

Other features and advantages of the disclosed embodiments will become apparent from the following detailed description, taken in conjunction with the accompanying drawings, which illustrate, by way of example, the features of the disclosed embodiments.

BRIEF DESCRIPTION OF THE DRAWINGS

The accompanying drawings, which are incorporated in and constitute a part of this specification, illustrate one or more embodiments and, together with the description, serve to explain the principles of the disclosed embodiments.

DETAILED DESCRIPTION OF THE PREFERRED EMBODIMENTS

The disclosed embodiments provide systems and methods for an enhanced Casino Surveillance System that leverages artificial intelligence to provide a specific technical solution for real-time detection of various events, including identification of specific individuals and potential damage to casino assets. The system aims to improve the efficiency and effectiveness of casino security operations—a technical field—by automating key monitoring tasks, improving the underlying computer's ability to process and interpret video data, and providing timely, actionable alerts to surveillance personnel through an improved human-computer interface.

Figure 1:
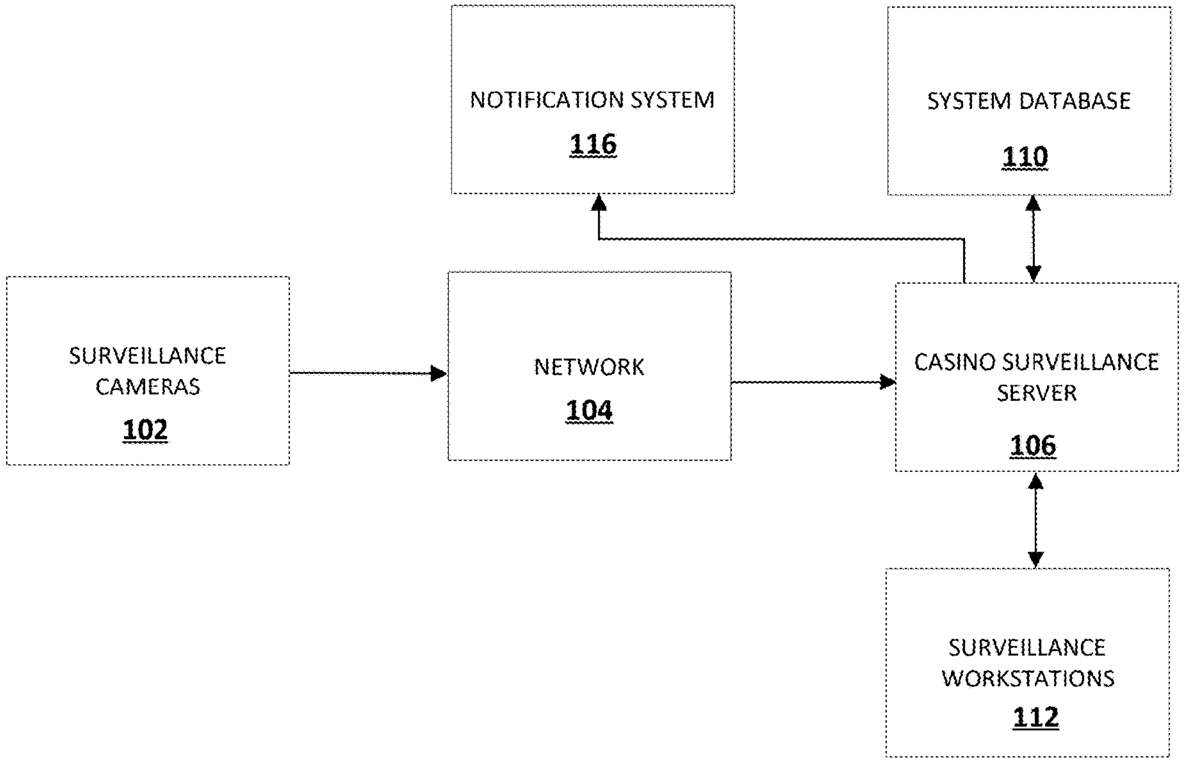
FIG. 1 illustrates a system architecture of a Casino Surveillance System in accordance with one or more embodiments.

Referring now to FIG. 1, a system architecture 100 of a Casino Surveillance System in accordance with one or more embodiments is shown. The system 100 includes a plurality of Surveillance Cameras 102 (e.g., 102*a*, 102*b*) strategically positioned throughout a casino environment to capture video feeds of various areas, including gaming floors, entry/exit points, and areas with valuable assets. These Surveillance Cameras 102 may be Internet Protocol (IP) cameras capable of transmitting digital video data, forming the sensory input for the computer system.

The video feeds from Surveillance Cameras 102 are transmitted over a Network 104 (e.g., a local area network) to a central Casino Surveillance Server 106. The Casino Surveillance Server 106 is a specialized processing system comprising one or more processors and memory, specifically configured and responsible for the core data processing and complex analytical tasks that improve upon manual review. This centralized processing of diverse data streams, including high-volume video and database information, using a specialized AI engine represents a significant improvement in the computer's ability to manage, interpret, and act upon complex security data specific to the casino environment. The Casino Surveillance Server 106 hosts an Artificial Intelligence (AI) Processing Engine 108, which performs computationally intensive real-time analysis of the incoming video feeds. The Casino Surveillance Server 106 is also communicatively coupled to a System Database 110. The System Database 110 is structured to store various types of data essential for the system's operation and improvement, including but not limited to, profiles for a Database of Known Individuals (e.g., banned persons, VIPs, employees), incident logs with associated metadata and video, recorded video segments corresponding to detected events, and configurations for the AI Processing Engine 108, thereby providing an organized data management framework for the computer system.

Surveillance personnel interact with the system via one or more Surveillance Workstations 112, which are typically computer terminals running a specialized Casino Surveillance User Interface (CSUI) 114. The CSUI 114 is a specifically designed Graphical User Interface (GUI) that displays live video feeds, processed alert notifications, historical event data, and provides technical tools for incident management, thereby enhancing the human-computer interaction for complex surveillance tasks. The Casino Surveillance Server 106 also includes or is connected to a Notification System 116, which is responsible for generating and dispatching Alert Notifications based on the AI Processing Engine's findings. These notifications, delivered through the CSUI 114 (e.g., as on-screen pop-ups or entries in an alert list) and optionally via other channels such as email or SMS messages to designated personnel, represent a transformation of raw data into actionable information by the computer system.

Figure 2:
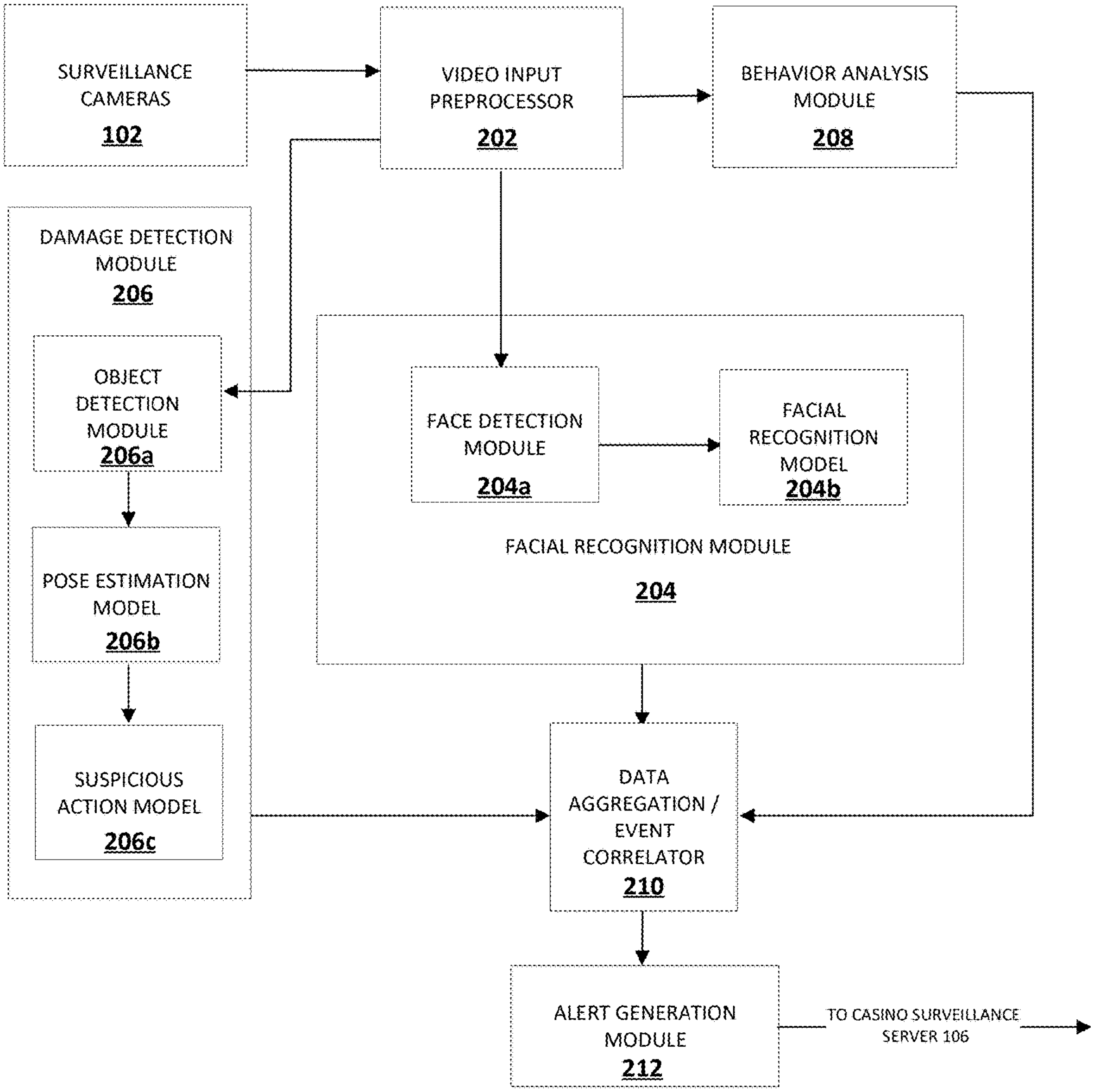
FIG. 2 illustrates components of an Artificial Intelligence Processing Engine within the Casino Surveillance System in accordance with one or more embodiments.

Referring now to FIG. 2, components of an exemplary Artificial Intelligence (AI) Processing Engine 108 within the Casino Surveillance Server 106 are illustrated, in accordance with one or more embodiments. The AI Processing Engine 108 is a specifically configured computational engine designed to process and analyze the video feeds received from the Surveillance Cameras 102 in a manner that improves upon prior systems. A Video Input Preprocessor 202 may first receive the raw video feeds and perform initial processing tasks such as decoding, demultiplexing, frame extraction, noise reduction, or image normalization. These preprocessing steps are technical operations designed to optimize the video data quality and format, thereby improving the input for subsequent analysis by various specialized AI modules and enhancing the overall computer's processing efficiency and accuracy.

The AI Processing Engine 108 includes a Facial Recognition Module 204. This module is configured as a practical application of AI to process portions of the video feeds to detect human faces and identify individuals against stored data. The specific technical pipeline within the Facial Recognition Module 204, comprising a Face Detection Model 204*a* (e.g., based on architectures like MTCNN or SSD with a ResNet backbone) to accurately locate human faces within dynamic video frames, and a Face Recognition Model 204*b* (e.g., employing deep learning models like ResNet-34, FaceNet, or ArcFace) to extract unique facial feature embeddings from the detected faces, is tailored for the challenges of a live casino environment, thereby overcoming difficulties associated with less integrated or less accurate prior identification methods. These embeddings are then compared by the computer system against embeddings stored in the Database of Known Individuals (within System Database 110) to determine if a match exists, a specific computational matching process.

The AI Processing Engine 108 also includes a Damage Detection Module 206, specifically designed as a technical solution to identify actions that may indicate potential or actual damage to casino assets (e.g., slot machines, gaming tables). This module represents a significant improvement over generic anomaly detection by employing a specific, ordered combination of AI capabilities. An Object Detection Model 206*a* (e.g., a model from the YOLO family like YoloV8, or SSD) is trained to identify and locate specific casino assets within the video feeds. The identification of a specific asset by this model provides crucial spatial and contextual information that subsequently constrains and focuses the analytical scope of other models, a key aspect of its improved technical functionality. A Pose Estimation Model 206*b* (e.g., based on OpenPose or YOLO-Pose) is then used to detect human presence near the specifically identified assets and to determine the spatial locations of human body key points (e.g., hands, feet, limbs). This targeting of pose estimation to regions relevant to a known asset is a specific technical refinement. A Suspicious Action Model 206*c* (e.g., an RNN, LSTM, or 3D CNN model) then analyzes the sequence of movements of these key points, specifically in their interaction with or aggressive motion towards the identified casino asset, to classify the action as potentially damaging (e.g., kicking, punching, pushing with force). This multi-stage process—asset identification, asset-relative pose estimation, and asset-directed action classification—provides a specific technical method that enhances the computer's ability to accurately distinguish between benign human activity and actions indicative of asset damage, reducing ambiguity and improving the reliability of damage-specific threat detection.

In some embodiments, the AI Processing Engine 108 may further include a Behavior Analysis Module 208. This module is configured to analyze video feeds for other types of predefined behaviors that are not necessarily related to asset damage but may be of security interest, such as detecting patterns of aggressive behavior between patrons, unusual loitering, or other policy violations, further enhancing the computer's analytical capabilities for overall casino security.

A Data Aggregator/Event Correlator 210 receives inputs from the various analytical modules (204, 206, 208). This component's function of intelligently correlating outputs from these different specialized AI modules represents a technical improvement in the computer's data processing pipeline. It enables the system to build a more comprehensive understanding of an event by fusing diverse analytical results or to reduce false alarms by requiring corroborating evidence from multiple analyses before an event is confirmed, which is an advancement over systems relying on isolated analytic functions. For example, it might correlate a facial recognition alert with an access control event if such systems are integrated.

Finally, an Alert Generation Module 212 is responsible for creating an Alert Notification when the Data Aggregator/Event Correlator 210 confirms that a predefined event type has been detected with sufficient confidence by the computer system. The Alert Notification typically contains structured information about the event, such as its type, location, time, and may include a relevant video clip or still image, transforming raw analytical output into a specific, actionable piece of information. This notification is then passed to the Notification System 116 (FIG. 1) for delivery to human operators.

Figure 3:
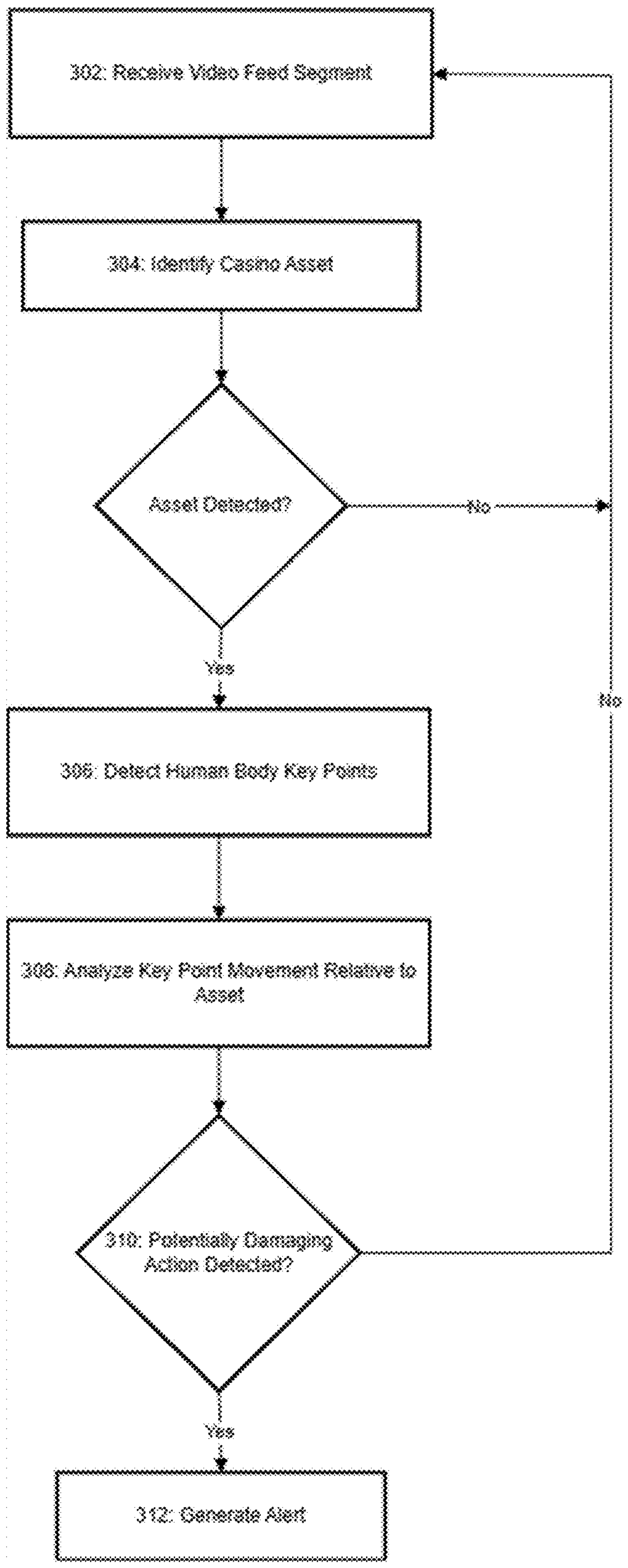
FIG. 3 is a flowchart illustrating a damage detection process performed by the Casino Surveillance System in accordance with one or more embodiments.

Referring now to FIG. 3, a flowchart illustrates an exemplary damage detection process 300 performed by the Damage Detection Module 206 of the Casino Surveillance System, in accordance with one or more embodiments. This process details a specific sequence of computer-implemented operations.

The process begins at step 302 with receiving a video feed segment by the computer system from a Surveillance Camera 102, typically focused on an area containing casino assets.

At step 304, the Object Detection Model 206*a*, a specialized AI component of the computer system, processes the video feed segment to identify and locate a casino asset (e.g., a specific slot machine or gaming table) based on its trained parameters.

If no relevant asset is detected by the computer system, the process may loop back or analyze other segments, indicating a conditional branching in the computer's logic.

If an asset is identified, at step 306, the Pose Estimation Model 206*b*, another specialized AI component, is employed by the computer system to detect any human individuals in proximity to the identified asset and to extract their body key points (e.g., positions of hands, feet, torso) from the video data. This step focuses the computer's analytical resources on human activity directly related to a recognized asset.

At step 308, the Suspicious Action Model 206*c* analyzes the data representing the movement and interaction of the detected human body key points specifically relative to the identified casino asset.

This analysis, performed by the computer system, focuses on identifying patterns of motion or contact that are indicative of intentional damage, such as forceful impacts, kicks, punches, or attempts to pry open parts of the asset, which are specific classifications learned by the model.

At step 310, a determination is made by the computer system whether a potentially damaging action has been detected.

This determination may be based on a confidence score generated by the Suspicious Action Model 206*c* exceeding a predefined threshold, a specific computational comparison.

If a damaging action is detected, the process proceeds to step 312, where an alert is generated by the Alert Generation Module 212 of the computer system, specifying the nature of the event (asset damage), the location, the asset involved, and potentially a video clip of the action, transforming the detection into a structured data output.

The alert is then transmitted by the computer system to surveillance personnel via the CSUI 114 and/or Notification System 116. If no damaging action is detected at step 310, the process may loop back to continue monitoring at step 302 or terminate for that segment, demonstrating adaptive control flow within the computer process.

Figure 4:
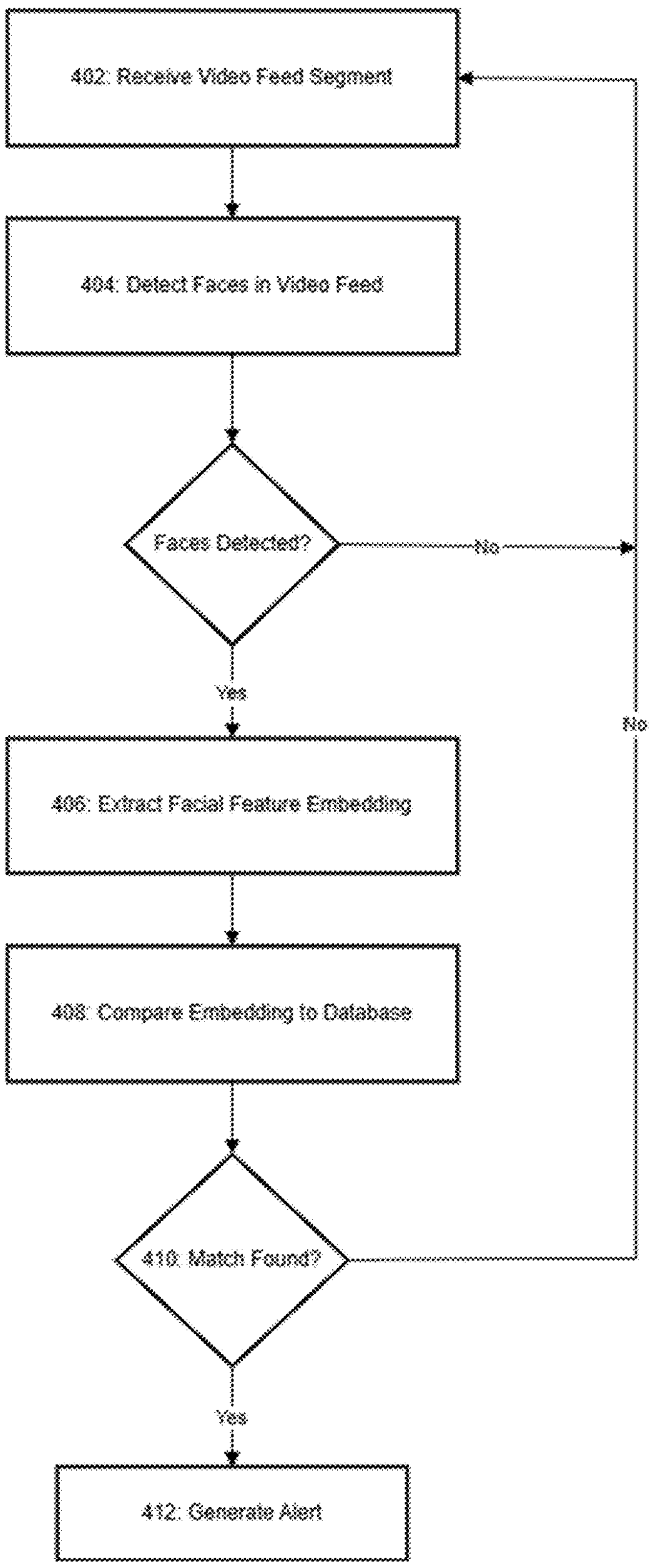
FIG. 4 is a flowchart illustrating a player identification process using facial recognition performed by the Casino Surveillance System in accordance with one or more embodiments.

Referring now to FIG. 4, a flowchart illustrates an exemplary player identification process 400 using facial recognition, performed by the Facial Recognition Module 204 of the Casino Surveillance System, in accordance with one or more embodiments. This process outlines a specific application of computer vision and database searching.

The process initiates at step 402 with the computer system receiving a video feed segment, often from cameras positioned at entrances or overlooking areas with high player traffic.

At step 404, the Face Detection Model 204*a*, operating within the computer system, processes the video feed to detect the presence and location of human faces within the frames, a specific image processing task.

If one or more faces are detected, for each detected face, the Face Recognition Model 204*b*, another component of the computer system, extracts a unique facial feature embedding at step 406. This embedding is a compact numerical representation of facial characteristics generated by the computer.

At step 408, this extracted embedding is compared by the computer system against the facial feature embeddings stored in the Database of Known Individuals (e.g., banned players, VIPs) within the System Database 110. This comparison typically involves the computer calculating a distance or similarity score between the extracted embedding and each stored embedding.

At step 410, a determination is made by the computer system whether the extracted embedding matches any entry in the database with a sufficiently high confidence score (e.g., if a distance metric is below a certain threshold, or a similarity score is above a threshold), a rule-based decision performed by the computer.

If a match is found, indicating the identified individual is a person of interest according to the system's data, an alert is generated at step 412 by the Alert Generation Module 212 of the computer system. The alert will typically include the identity of the matched individual (if known, e.g., name or ID from the database), the reason for the alert (e.g., "Banned Player Detected," "VIP Player Entered"), location, time, and an image or video clip, providing specific, actionable information.

This alert is then transmitted by the computer system to surveillance personnel. If no match is found at step 410, or if no faces were detected at step 404, the process may loop back to step 402 for the computer system to continue monitoring.

Figure 5:
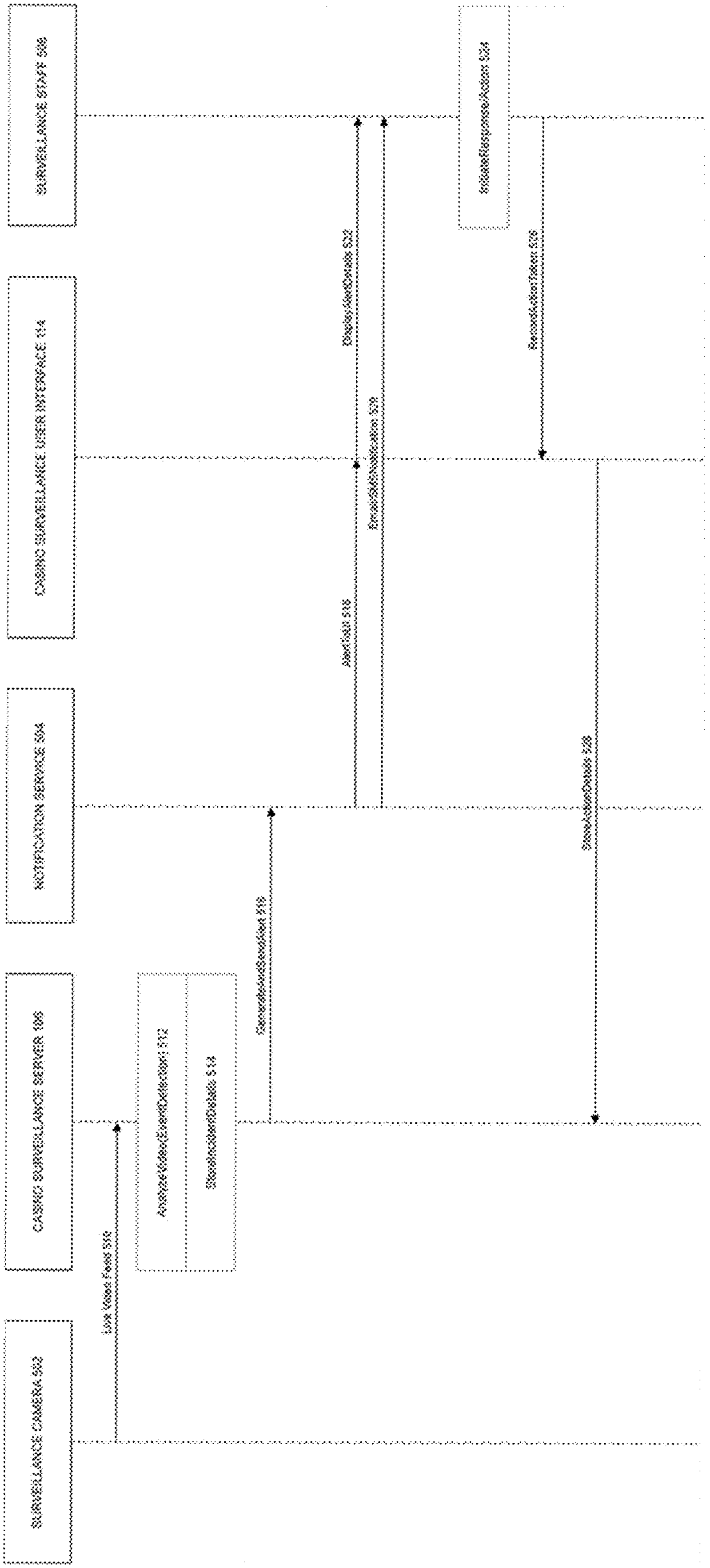
FIG. 5 is a sequence diagram illustrating an incident handling workflow involving the Casino Surveillance System in accordance with one or more embodiments.

Referring now to FIG. 5, a sequence diagram illustrates an exemplary incident handling workflow 500 involving the Casino Surveillance System, in accordance with one or more embodiments. This workflow demonstrates an improved human-computer interaction process for managing security incidents, streamlined by the system's capabilities.

The participants shown are a Surveillance Camera 502, the Casino Surveillance Server 106 (which includes the AI Processing Engine 108 and System Database 110), a Notification Service 504 (which can be part of server 106 or a separate entity like 116 from FIG. 1), the Casino Surveillance User Interface (CSUI) 114 (running on a Surveillance Workstation 112), and Surveillance Staff 506.

The sequence begins when the Surveillance Camera 502 captures a Live Video Feed 510 of an event (e.g., a player damaging a machine or a banned player entering) and transmits this raw data to the Casino Surveillance Server 106.

The Casino Surveillance Server 106 performs Analyze Video (EventDetection) 512 using its AI Processing Engine 108. This involves specific, computationally intensive processes like those described in FIG. 3 or FIG. 4, transforming the raw video data into a categorized event detection.

Upon detecting a predefined event, the Casino Surveillance Server 106 internally logs StoreIncidentDetails 514 into its System Database 110, creating a structured digital record of the AI's finding.

The Casino Surveillance Server 106 then instructs the Notification Service 504 to GenerateAndSendAlert 516, a command initiating communication of the processed information.

The Notification Service 504 sends an AlertToUI 518 to the CSUI 114 and may also send an Email/SMSNotification 520 to pre-designated Surveillance Staff 506, ensuring timely delivery of critical information through multiple computer-managed channels.

The Surveillance Staff 506, via the CSUI 114, receives and reviews the DisplayAlertDetails 522, which includes AI-generated metadata and may include video evidence, presented in a manner designed for efficient human assessment.

The Surveillance Staff 506 then takes appropriate InitiateResponse/Action 524 based on casino protocols (e.g., dispatching security personnel), with their decision-making augmented by the information provided by the system.

After or during the response, the Surveillance Staff 506 interacts with the CSUI 114 to RecordActionTaken 526 for the incident, inputting data into the system.

The CSUI 114 transmits this information, and the Casino Surveillance Server 106 updates the incident log with StoreActionDetails 528 in the System Database 110, completing the digital record for accountability and future analysis.

Figure 6:
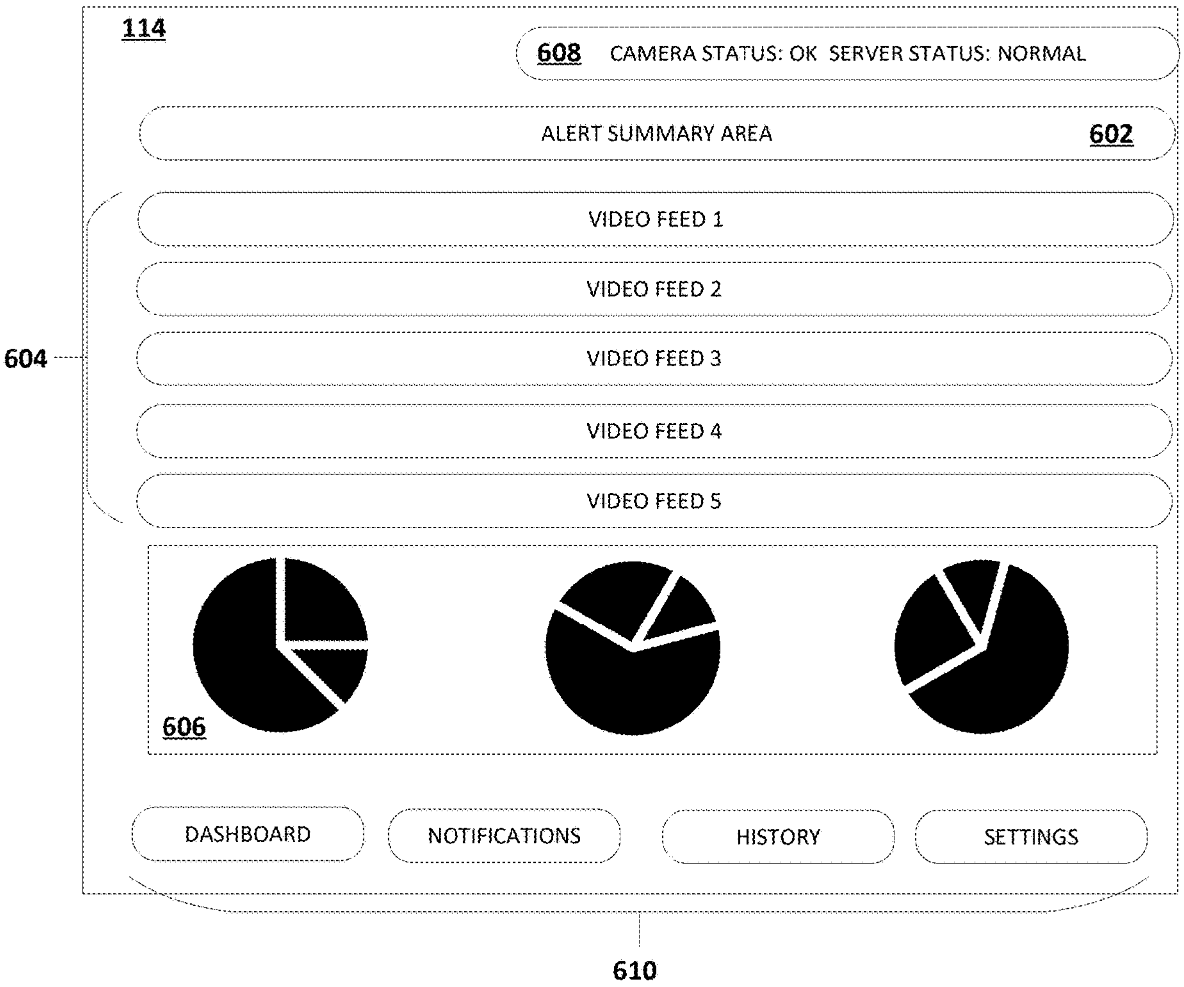
FIG. 6 illustrates an exemplary screen layout of a main dashboard of a Casino Surveillance User Interface in accordance with one or more embodiments.

Referring now to FIG. 6, an exemplary screen layout of a main dashboard 600 of a Casino Surveillance User Interface (CSUI) 114 is shown, in accordance with one or more embodiments. The dashboard 600 is a specialized GUI component that provides surveillance personnel with an at-a-glance, actionable overview of the security status and recent AI-detected events, improving their situational awareness and ability to manage multiple information streams.

The layout may include an Alert Summary Area 602, which lists recent or high-priority alerts with key information like event type, time, and location, prioritized and filtered by the system to draw attention to the most critical data points. Each entry might be selectable to view more details (as in FIG. 7).

A Live Camera Feeds Area 604 could display tiled video feeds from selected important cameras or cameras automatically associated by the system with recent alerts, providing immediate visual context.

An Event Statistics Area 606 may present graphical information, such as charts or graphs showing the number of different types of events detected over time (e.g., vandalism attempts, banned player entries, VIP arrivals), offering insights into trends that are computationally derived by the system.

A System Status Area 608 may display the operational status of various components of the Casino Surveillance System, such as camera connectivity or server health, which is crucial for maintaining the reliability of this computer-based tool.

Navigation Controls 610 (e.g., menus, buttons) allow users to efficiently access different parts of the CSUI 114, such as detailed incident logs, system settings, or reporting tools, facilitating effective human interaction with the complex underlying system.

Figure 7:
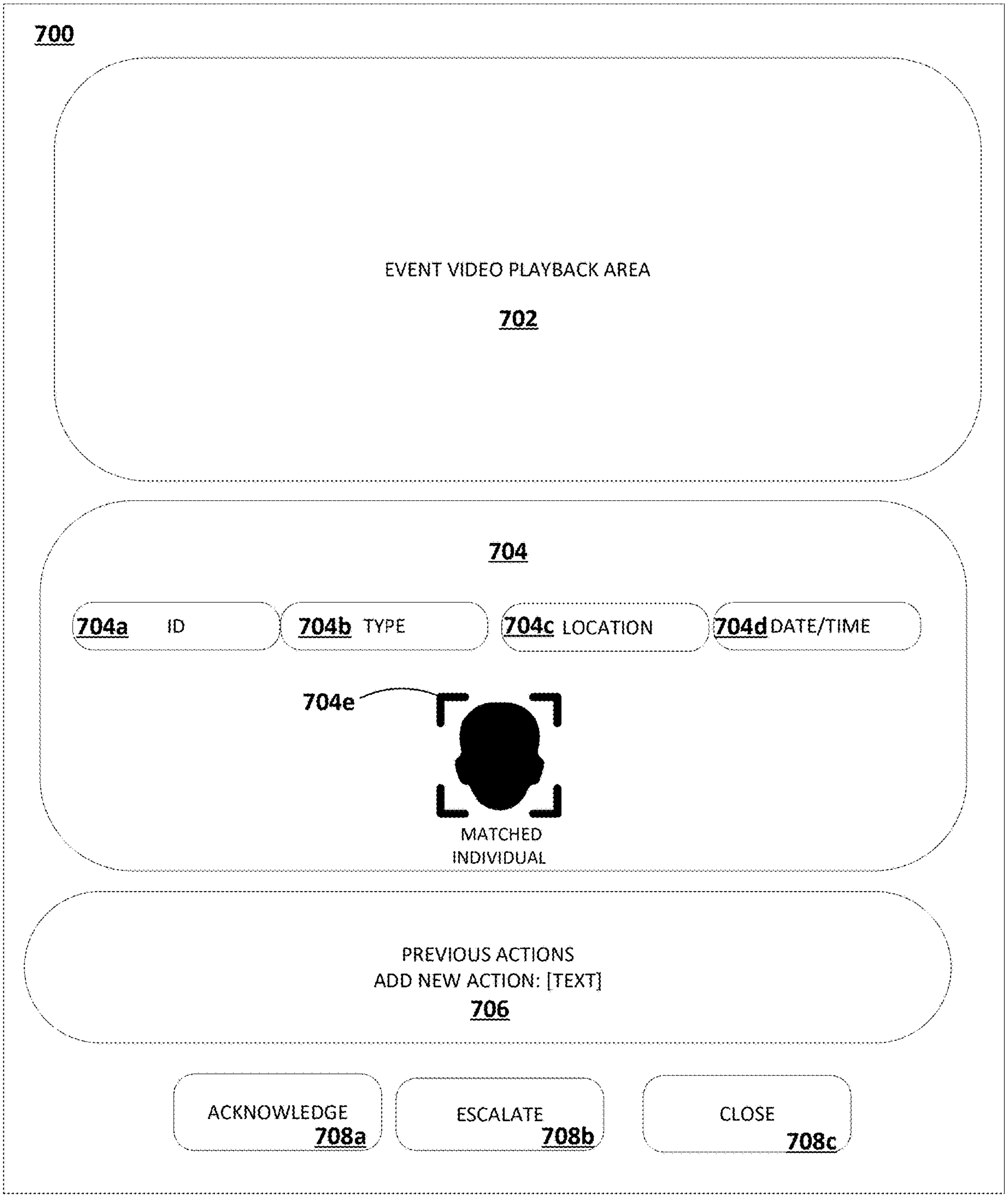
FIG. 7 illustrates an exemplary screen layout of an alert details view within the Casino Surveillance User Interface in accordance with one or more embodiments.

Referring now to FIG. 7, an exemplary screen layout of an alert details view 700 within the Casino Surveillance User Interface (CSUI) 114 is shown, in accordance with one or more embodiments. This view, a specific technical implementation of a GUI, is typically accessed by selecting a specific alert from the dashboard 600 or an alert list and is designed to present multifaceted AI-generated information in an integrated and interpretable way for human operators.

The alert details view 700 prominently displays an Event Video Playback Area 702, showing the recorded video segment associated with the detected event. Playback controls (e.g., play, pause, scrub), not shown, are also provided, allowing precise review of the visual data that triggered the AI detection.

An Event Information Panel 704 provides textual details about the alert, systematically organized by the system, such as Event ID **704*a*, Event Type 704*b* (e.g., "Asset Damage," "Banned Player"-classifications made by the AI), Location 704*c*, Date/Time 704*d*, and any identified individuals or assets based on the AI analysis. If a facial recognition match occurred, an Image of Matched Individual 704*e*** may be displayed alongside database information, directly linking the AI's finding with stored data. The integrated display of video evidence alongside AI-derived metadata within this panel provides a technical tool that streamlines the alert verification and decision-making process for surveillance staff.

An Action Log/Input Area 706 allows surveillance personnel to view any actions already taken in response to the alert and to input new actions or comments into the system. This may include fields for selecting an action type, adding notes, and assigning the incident to personnel, facilitating a structured digital record of the human response to AI-generated alerts. Buttons like "Acknowledge Alert" **708*a*, "Escalate Incident" 708*b*, or "Close Incident" 708*c*** may be provided, enabling efficient workflow management within the GUI.

Figure 8:
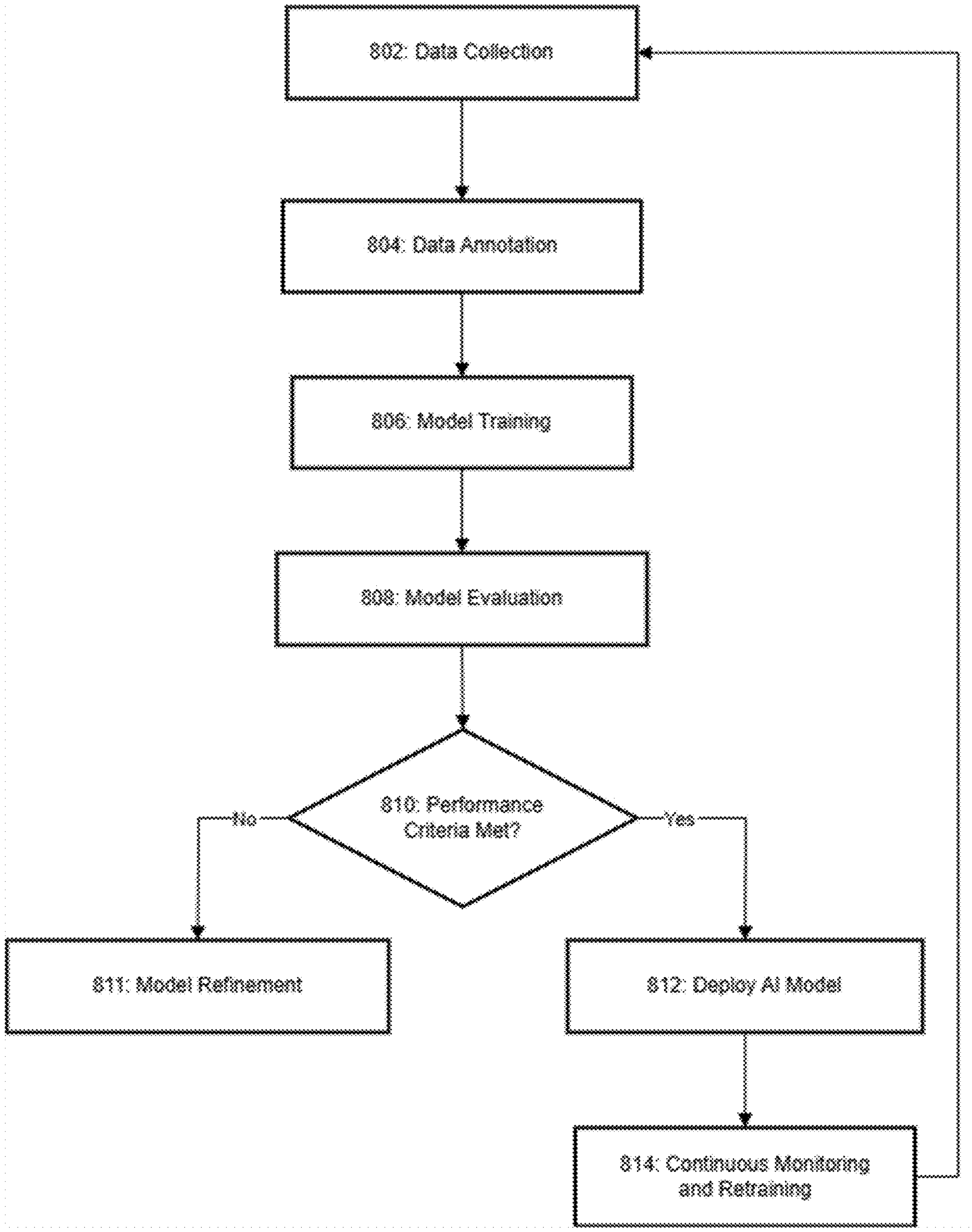
FIG. 8 is a flowchart illustrating a process for training and updating artificial intelligence models used by the Casino Surveillance System in accordance with one or more embodiments.

Referring now to FIG. 8, a flowchart illustrates a process 800 for training and updating artificial intelligence models used by the Casino Surveillance System, in accordance with one or more embodiments. Effective AI performance and its adaptation to specific casino environments rely on these robust and continuously refined computer models.

The process begins at step 802 with Data Collection. This involves a targeted effort of gathering relevant data, such as video footage from casino cameras (capturing normal operations, staged incidents, or actual past incidents specifically chosen for their relevance to training objectives) and images of individuals for facial recognition databases.

At step 804, Data Annotation is performed. This is a critical technical step where the collected data is meticulously labeled by human annotators or semi-automated tools to create ground truth for supervised learning by the computer models. For example, in videos for damage detection, frames might be annotated with precise bounding boxes around specific casino assets, key points for human poses involved in interactions with those assets, and labels for specific actions (e.g., "kick," "punch," "normal interaction"). The specifics of this annotation, such as clearly distinguishing "kicks on a slot machine" from "benign leg movement near a slot machine," are crucial for training AI models that can accurately perform the specific technical task of damage detection, moving beyond generic object or action recognition capabilities. For facial recognition, faces are labeled with identities.

At step 806, Model Training occurs. The annotated data is split by the system into training and validation sets. The training set is used by the computer system to train the various AI models (e.g., Object Detection Model 206*a*, Pose Estimation Model 206*b*, Suspicious Action Model 206*c*, Facial Recognition Models 204*a*, 204*b*) by computationally adjusting their internal parameters (weights) to learn patterns and relationships from the specifically prepared data.

Following training, at step 808, Model Evaluation is conducted. The trained models are tested by the computer system on the separate validation or test dataset (data not seen during training) to assess their performance on the specific surveillance tasks using quantitative metrics like accuracy, precision, recall, and F1-score.

At step 810, a decision is made by the system or an administrator based on the evaluation results. If the model performance meets predefined criteria for the specific casino application, it proceeds to deployment. Otherwise, the process may loop back to step 802 for more targeted data collection, step 804 for refined annotation, or step 806 for further training iterations or adjustments to the model architecture (Model Refinement 811), representing an iterative improvement cycle for the computer models.

If performance is satisfactory, the trained and validated AI model is Deployed to the AI Processing Engine 108 of the Casino Surveillance Server 106 at step 812, where it replaces or augments existing models, thereby updating the computer's analytical capabilities.

The process includes a feedback loop for Continuous Monitoring and Retraining at step 814. Performance of the deployed models is monitored by the system and/or human operators in the live operational environment. New data, including instances of false positives, false negatives identified during operation, or newly identified threat patterns, is collected and fed back into the system (looping back to step 802). This iterative feedback loop, where operational data is used to periodically retrain and update the models, is a specific mechanism for improving the computer system's analytical accuracy and adapting its performance over time to the specific and evolving conditions of the casino environment.

The disclosed Casino Surveillance System, through its integrated AI-driven facial recognition and the specific multi-stage technical process for asset damage detection, offers significant technical advantages and constitutes a practical application of AI technology to solve recognized problems in casino security. It enhances the ability of casino operators to proactively identify and respond to security threats by improving the underlying computer's ability to analyze video data with greater specificity and accuracy, thereby improving asset protection, ensuring patron safety, and maintaining game integrity. The system's architecture is specifically designed for real-time processing of multiple video feeds, and the specialized AI modules, particularly the Damage Detection Module with its integrated object detection, asset-relative pose estimation, and targeted suspicious action classification, provide a level of analytical depth and accuracy in identifying potential asset damage that is an improvement over less integrated or more generic AI approaches, directly enhancing the computer's ability to distinguish specific threats from benign activity. The Casino Surveillance User Interface (CSUI), as a Graphical User Interface (GUI), is specifically designed to present complex AI-generated alerts and associated data in an efficient and interpretable manner, providing a technical tool that improves human-machine interaction and the speed and quality of response times for surveillance personnel. The structured approach to AI model training and updating, including the use of casino-specific annotated data and a continuous retraining loop, ensures the computer system can adapt to evolving threats and maintain its effectiveness, representing an improvement in the management and performance of the AI components themselves.

It is to be understood that the embodiments described herein are illustrative of the principles of the underlying invention. For example, while specific AI models and architectures (e.g., YOLO, ResNet) are mentioned as examples, other suitable models capable of performing the described functions (object detection, pose estimation, facial recognition, action classification) may be utilized. The specific types of casino assets monitored, the range of behaviors detected by the Behavior Analysis Module, and the communication protocols used within the system may also vary. The system may be further integrated with other casino management or security systems, such as access control, point-of-sale systems, or responsible gaming platforms, to create an even more comprehensive computer-based security ecosystem. The division of processing tasks between server-based components and potential edge devices (e.g., smart cameras with some onboard processing capabilities) may also be adapted based on scalability and performance requirements for the computer system.

Well-known circuits and other items have not been described in detail in order not to obscure the present invention in unnecessary detail. These and other modifications may be made by those skilled in the art without departing from the scope and spirit of the invention.

What is claimed is:

1. A method for providing enhanced casino surveillance, the method comprising:

receiving, by a casino surveillance system comprising a processing system and memory storing instructions, a plurality of video feeds from one or more surveillance cameras monitoring a casino environment;

analyzing, by an artificial intelligence processing engine of the casino surveillance system, the plurality of video feeds in real-time to detect one or more predefined event types, wherein analyzing comprises:

processing a first portion of the video feeds by a facial recognition module to identify individuals and determine if an identified individual matches an entry in a database of known individuals; and processing a second portion of the video feeds by a damage detection module to identify actions indicative of potential damage to casino assets, wherein the damage detection module is configured to:

identify a casino asset within the second portion of the video feeds using an object detection model;

detect human body key points of an individual in proximity to or in contact with the identified casino asset using a pose estimation model; and classify an action, based on movement of the detected human body key points relative to the identified casino asset, as indicative of potential damage using a suspicious action model;

generating, by the casino surveillance system, an alert notification based on the detection of a predefined event type; and transmitting, by the casino surveillance system, the alert notification to a user interface for review by surveillance personnel.

2. The method of claim 1, wherein the database of known individuals includes at least one of a list of banned individuals or a list of very important person (VIP) individuals.

3. The method of claim 1, wherein the facial recognition module utilizes a first set of artificial intelligence models comprising a face detection model to locate faces in the first portion of the video feeds and a face recognition model to extract facial features from the located faces.

4. The method of claim 3, wherein the face recognition model compares the extracted facial features of an identified individual to stored facial features in the database of known individuals using a predefined distance metric.

5. The method of claim 1, wherein the suspicious action model is trained using historical video data of incidents involving damage to casino assets.

6. The method of claim 1, wherein the suspicious action model is configured to classify actions including at least one of a kick, a punch, or a push directed towards the identified casino asset.

7. The method of claim 1, wherein analyzing the plurality of video feeds further comprises processing a third portion of the video feeds by a behavior analysis module to detect predefined patterns of behavior classified as at least one of aggressive or inappropriate, distinct from the actions indicative of potential damage to casino assets.

8. The method of claim 1, wherein the alert notification includes information specifying at least one of: a location of the detected predefined event type, a time of the detected predefined event type, a classification of the detected predefined event type, or a video segment corresponding to the detected predefined event type.

9. The method of claim 1, further comprising: receiving, via the user interface, an input from surveillance personnel indicating an action taken in response to the alert notification; and storing, by the casino surveillance system, a record of the detected predefined event type and the action taken in a log database.

10. The method of claim 1, wherein the user interface provides a dashboard displaying a summary of detected predefined event types and statuses associated with the detected predefined event types.

11. A casino surveillance system, comprising:

a plurality of surveillance cameras configured to capture a plurality of video feeds of a casino environment;

a processing system; and a memory communicatively coupled to the processing system and storing instructions that, when executed by the processing system, configure the casino surveillance system to:

receive the plurality of video feeds from the plurality of surveillance cameras;

analyze, via an artificial intelligence processing engine, the plurality of video feeds in real-time to detect one or more predefined event types, wherein the artificial intelligence processing engine comprises:

a facial recognition module configured to process a first portion of the video feeds to identify individuals and determine if an identified individual matches an entry in a database of known individuals; and a damage detection module configured to process a second portion of the video feeds to identify actions indicative of potential damage to casino assets, wherein the damage detection module is further configured to: identify a casino asset within the second portion of the video feeds using an object detection model;

detect human body key points of an individual in proximity to or in contact with the identified casino asset using a pose estimation model; and classify an action, based on movement of the detected human body key points relative to the identified casino asset, as indicative of potential damage using a suspicious action model;

generate an alert notification based on the detection of a predefined event type; and transmit the alert notification to a user interface for review by surveillance personnel.

12. The system of claim 11, wherein the database of known individuals is configured to store data identifying at least one of banned individuals or very important person (VIP) individuals.

13. The system of claim 11, wherein the facial recognition module comprises a face detection model configured to locate faces in the first portion of the video feeds and a face recognition model configured to extract facial features from the located faces.

14. The system of claim 13, wherein the face recognition model is configured to compare the extracted facial features of an identified individual to stored facial features in the database of known individuals using a predefined distance metric.

15. The system of claim 11, wherein the suspicious action model is trained using historical video data of incidents involving damage to casino assets.

16. The system of claim 11, wherein the suspicious action model is configured to classify actions including at least one of a kick, a punch, or a push directed towards the identified casino asset.

17. The system of claim 11, wherein the artificial intelligence processing engine further comprises a behavior analysis module configured to process a third portion of the video feeds to detect predefined patterns of behavior classified as at least one of aggressive or inappropriate, distinct from the actions indicative of potential damage to casino assets.

18. The system of claim 11, wherein the alert notification includes information specifying at least one of: a location of the detected predefined event type, a time of the detected predefined event type, a classification of the detected predefined event type, or a video segment corresponding to the detected predefined event type.

19. The system of claim 11, wherein the user interface is further configured to receive an input from surveillance personnel indicating an action taken in response to the alert notification; and wherein the casino surveillance system is further configured to store a record of the detected predefined event type and the action taken in a log database.

20. The system of claim 11, wherein the user interface is configured to display a dashboard summarizing detected predefined event types and statuses associated with the detected predefined event types.

* * * * *